United States Patent [19]

Kono et al.

[11] Patent Number: 5,853,633

[45] Date of Patent: Dec. 29, 1998

[54] METHOD OF PRODUCING MICROPOROUS THERMOPLASTIC RESIN MEMBRANE

[75] Inventors: Koichi Kono; Kotaro Takita, both of Kawasaki, Japan

[73] Assignee: Tonen Chemical Corporation, Tokyo, Japan

[21] Appl. No.: 666,074

[22] Filed: Jun. 19, 1996

[30] Foreign Application Priority Data

Jun. 19, 1995 [JP] Japan .................................. 7-175502

[51] Int. Cl.$^6$ .................................................... C08J 9/18
[52] U.S. Cl. ............................ 264/54; 264/41; 264/288.8; 428/304.4; 210/510.1
[58] Field of Search .................................. 264/50, 53, 54, 264/41, 288.8, 321; 428/304.4; 210/510.1

[56] References Cited

U.S. PATENT DOCUMENTS 4,734,196  3/1988  Kono et al. .
5,422,377  6/1995  Aubert .

OTHER PUBLICATIONS

Derwent Publications Ltd., Abstract 86–016512 of Japanese Published Application No. 60 238 334 (Nov. 27, 1985).

*Primary Examiner*—David A. Reifsnyder
*Attorney, Agent, or Firm*—Venable; John W. Schneller

[57] ABSTRACT

A method of producing a microporous thermoplastic resin membrane of excellent permeability having uniform and fine micropores without filling stress concentrators to the thermoplastic resin is provided. Namely, there is provided a method of producing a microporous thermoplastic resin membrane, in which a thermoplastic resin foam incorporating fine cells having a ratio B/A between a cell size (A) and a wall thickness (B) of the cells of less than 0.5 and having a void ratio of not less than about 50% is subjected to plastic deformation of the boundaries of the cells themselves sufficient to cause shape deformation of the cells, thereby breaking the boundaries of the cells. Also there is provided a microporous thermoplastic resin membrane of excellent permeability having uniform and fine micropores produced by the method as described above.

7 Claims, No Drawings

METHOD OF PRODUCING MICROPOROUS THERMOPLASTIC RESIN MEMBRANE

BACKGROUND OF THE INVENTION

1. Field of the Invention

The present invention concerns a method of producing a microporous thermoplastic resin membrane and, more in particular, it relates to a method of producing a microporous membrane formed by breaking cells of a predetermined shape formed in a molded product without filling stress concentrators.

2. Technology Review

Microporous membranes are widely used in various applications such as battery separators, electrolytic capacitor separators, various filters, moisture-permeable waterproof clothes, electrolyte thin film, liquid crystal thin film, liquid separation membranes, and materials for gas separation membranes, and filters for medical purposes.

Methods of producing the microporous membranes include, for example, a mixing/extraction process comprising the steps of mixing a polyolefin with a pore-forming agent comprising fine powder of different polymers and inorganic material into a state of micro-dispersion, and subsequently extracting the pore-forming agent, and a stretching process comprising the steps of imparting strain such as stretching to a molded polyolefin article containing different solids in a state of micro-dispersion, to break the interfaces between the polyolefin and the different solids, thereby forming pores. However, since stress concentrators such as different polymers and different solids are filled in the polyolefin in these processes, they involve problems in that the fillers may give undesired effects depending on the use of the resultant microporous membrane. Furthermore, the fillers are dispersed inhomogeneously, resulting in non-uniform micropores.

SUMMARY OF THE INVENTION

An object of the present invention is to provide a method of producing a microporous thermoplastic resin membrane with excellent permeability having uniform micropores, without filling stress concentrators in a thermoplastic resin.

Another object of the present invention is to provide a thermoplastic resin foam for producing a microporous membrane with excellent permeability having uniform and microporous membranes.

A further object of the present invention is to provide a microporous thermoplastic resin membrane having uniform and microporous membranes and excellent permeability formed by the production method as described above.

In order to attain the foregoing objects, the present inventors have made an earnest study and, as a result, have found that a microporous membrane with excellent permeability can be obtained without using stress concentrators, by forming fine cells of a predetermined shape in a thermoplastic resin molded product and breaking the interfaces of the cells.

Namely, the present invention provides a method of producing a microporous thermoplastic resin membrane in which a thermoplastic resin foam containing fine cells having a ratio (B/A) between a cell size (A) and a wall thickness (B) of the cells of less than 0.5 and having a void ratio not less than about 50% is subjected to plastic deformation to the boundaries of the cells themselves to such an extent as to exceed the shape deformation of the cells, thereby breaking the boundaries of the cells.

Also, the present invention provides a microporous thermoplastic resin membrane with excellent permeability having uniform micropores, which is obtained by subjecting the porous thermoplastic resin foam having the specified cell structure as described above to plastic deformation of the boundaries of the cells themselves to such an extent as to exceed the shape deformation of the cells, thereby breaking the boundaries of the cells

DETAILED DESCRIPTION OF THE PREFERRED EMBODIMENTS

The thermoplastic resin in the present invention includes polyolefins such as crystalline homopolymers or copolymers formed by polymerizing, for example, ethylene, propylene, 1-butene, 4-methylpentene and 1-hexene, and a blend of them, vinyl chloride resin, vinyl acetate resin, polystyrene, fluororesin, polyimide resin, polyacetal resin, polycarbonate, thermoplastic polyimide, thermoplastic polyurethane, polyphenylene sulfide and polyvinyl alcohol. Among them, a polyolefin such as polyethylene or polypropylene is preferred in view of the moldability and the economical point. In particular, a polyolefin containing high molecular weight components is preferred, and a high density polyethylene containing an ultrahigh molecular weight high density polyethylene is particularly preferred in view of the strength and aimed micropores to be formed.

The thermoplastic resin foam in the present invention incorporates fine cells therein and the ratio B/A between the cell size (A) and the wall thickness (B) of the cells is less than 0.5, preferably less than 0.3, more preferably less than 0.25. Further, the void ratio of the foam is not less than about 50%, preferably, not less than about 70%, more preferably not less than about 75%. Since the foam of the present invention has fine cells and thin walls, it causes flex deformation to result in depression of fine cells when stress exerts to the foam so as to cause plastic deformation, and thin walls themselves cause plastic deformation when a further stress exerts, to form micropores. If the ratio B/A between the size of the cells (A) and the wall thickness (B) of the cell is not less than 0.5, the cells are only deformed and enlarged, failing to obtain the aimed to microporous membrane of a fine structure. On the other hand, if the void ratio is less than about 50%, no satisfactory microporous membranes can be obtained as well.

In this specification, "cell" means the minimum unit of the cell structure constituting a thermoplastic resin foam, which is a small individual space covered by walls.

The fine cells which constitute the thermoplastic resin foam of the present invention preferably have such a size as not larger than the thickness of the foam. It is preferred that the diameter of the cell is from about 0.1 $\mu$m to 10 $\mu$m and the thickness of the cell wall is preferably about from about 0.01 $\mu$m to 10 $\mu$m.

The thermoplastic resin foam having such fine cells can be formed by any of production methods, for example, by the following methods:

(1) A method of forming a low density gel from the thermoplastic resin in the form of a solution, by temperature change or phase conversion due to contact with a poor solvent.

(2) A method of forming a foam by mixing a thermoplastic resin with an organic decomposable foaming agent and decomposing the organic decomposable foaming agent by temperature change.

(3) A method of physically introducing air, inert gas, low boiling point substance or the like to a thermoplastic resin in a molten state or in the form of a solution, growing the cells by pressure change upon extrusion of the resin and fixing them.

(4) A method of sintering the powder of a thermoplastic resin.

The condition for the production of the foam is controlled in the production step such that the foam incorporates fine cells at a ratio B/A between the void size (A) and the wall thickness (B) of the cell and the cell ratio is not less than about 50%.

Among the methods described above, it is preferred that the foam of the present invention is formed by using the method (1) or (2) since relatively fine cells can be formed stably.

According to the method (1), a gel-like product is formed by dissolving under heating a thermoplastic resin in an organic solvent, extruding the solution from a die followed by cooling, or by conversion of phase due to contact with a poor solvent. The solvent is removed from the gel-like product to form fine cells. A method of producing from a composition containing an ultrahigh molecular weight polyolefin is particularly preferred in view of the strength of the microporous membrane obtained. The production process from the polyolefin composition containing the ultrahigh molecular weight polyolefin includes the following method.

The polyolefin is at first dissolved in a solvent under heating to prepare a solution. There is no particular restriction for the solvent so long as it can dissolve the polyolefin effectively. Examples of the solvent include aliphatic or cyclic hydrocarbons such as nonane, decane, undecane, dodecane and liquid paraffin or fractions of mineral oils having boiling points corresponding to them. Non-volatile solvent such as liquid paraffin is desirable for obtaining a stable gel-like product.

Heat dissolution of the polyolefin is carried out under stirring at a temperature at which it is completely dissolved in the solvent. The temperature varies depending on the polymer and the solvent used and it generally ranges from about 140° C. to 250° C. in the case of polyethylene composition. The concentration of the polyolefin solution is from 10% by weight to 50% by weight, preferably from 10% by weight to 40% by weight. When the concentration is less than 10% by weight and most preferably form 15% to 35% by weight, a large amount of a solvent has to be used uneconomically, and swelling and neck-in are likely to take place at the exit of a die making it difficult to form a sheet in the sheet forming process. On the other hand, if the concentration exceeds 50% by weight, it is difficult to prepare a homogeneous solution. It is desirable to add an antioxidant to the solution to protect the polyolefin from oxidative degradation upon dissolution under heating.

Subsequently, the polyolefin solution is extruded through the die and formed into a gel-like sheet by cooling. Usually, a sheet die having a rectangular orifice is used, but a double-walled cylindrical hollow die, an inflation die or the like may also be used. When the sheet die is used, a die gap is usually from 0.1 mm to 5 mm, and heated at 140° C.–250° C. in the extrusion process. In this case, an extrusion speed is usually from 20 cm/min–30 cm/min to 2 m/min–3 m/min.

A solution thus extruded through the die is formed into a gel-like product by cooling. Cooling is preferably conducted at least to a gelation temperature or lower at a speed of about 50° C./minute or more. Generally, if the cooling speed is high, the crystallization degree of the resultant gel-like product is increased, and the size of pseudo-cell units which form the structure is decreased. On the contrary, if the cooling speed is low, rough cell units are formed. If the cooling speed is less than about 50° C./min, the degree of crystallization is increased, making it difficult to obtain a gel-like product suitable to stretching. As the cooling method, a method of bringing the solution into direct contact with cold blow, cooling water or like other cooling medium, a method of bringing the solution into contact with a roll cooled by a cooling medium may be used. The solution extruded from the die may be drawn at a draw ratio of from 1 to 10, preferably, from 1 to 5 before or during cooling. If the draw ratio is more than 10, neck-in is likely to take place, and the breakdown of the sheet upon stretching tends to occur undesirably.

This method can produce a cell-enriched foam in which a resin forms sufficiently thin walls, the ratio B/A between the size of the cells (A) and the wall thickness (B) of the cell is less than 0.5 and the void ratio is not less than about 50%.

In the method (2) of using the foaming agent, a decomposable foaming agent is used. As the example of the foaming agent, azodicarbonamide, metal azodicarboxylate, dinitrosopentamethylene tetramine, hydrazodicarbonamide, p-toluene sulfonyl semicarbazide, and s-trihydrazinotriazine can be mentioned.

The addition amount of the foaming agent is generally about from 0.1 parts by weight to 10 parts by weight based on 100 parts by weight of the thermoplastic resin. A foaming aid or a cross-linking aid for controlling the cell size can optionally be added in order to control the decomposing behavior of the foaming agent. The addition amount of the foaming aid or the cross-linking aid is generally about from 0.5 parts to 50 parts by weight based on 100 parts by weight of the thermoplastic resin.

The method of forming cells by adding the foaming agent to the thermoplastic resin includes, for example, a method of heating the thermoplastic resin under pressure in a die to decompose the foaming agent and then reducing the pressure to expand the resin, a method of molding the thermoplastic resin in a die, taking it out and decomposing it by heating again to expand it, in addition to the method of conducting extrusion at a die temperature not lower than the decomposing temperature of the foaming agent. In order to maintain the shape of the cells in the thermoplastic resin foam, it is preferred that the resin is subjected to cross-linking. The method of cross-linking includes a method of using a chemical cross-linking agent such as an organic peroxide and a method of irradiating radiation rays such as electron rays.

The cells obtained according to each of the methods described above can assume various forms depending on the forming methods and molding conditions, and may be any of a closed or opening type in which cells are independent of or connected with each other, or a mixture thereof, the closed type being particularly preferred.

The boundary of the cells may be in any of planar, columnar or fibrous shape, with the planar shape being particularly preferred. Further, the microstructure constituting the boundary of the cells may be any of a high molecular lamella crystal or a stacked thereof growing one-dimensionally either in a fibrous or columnar shape, growing two-dimensionally as a planar shape, or further growing three-dimensionally in a spherical shape.

In the present invention, it is necessary to break the boundary of the cells of the foam. The boundary of the cells themselves are plastically deformed by exerting a tensile stress or a compression stress and then exerting a tensile stress on the foam at such an extent as exceeding the shape deformation of the cells. Specifically, the foam is subjected to stretching or calendering, followed by predetermined stretching. Orientation is accomplished by an ordinary method such as a tenter method, a roll method, an inflation method, a calendering method or a combination thereof at a predetermined factor.

In the method (1), stretching is carried out at least monoaxially, preferably, biaxially. Stretching may be applied either simultaneously or sequentially, with simultaneous biaxial stretching being particularly desirable. The stretching temperature is lower than the melting point of the thermoplastic resin plus 10° C. or, preferably, ranges from the crystalline dispersion temperature to lower than the crystalline melting point. In a case of polyethylene, for example, it is from 90° C. to 140° C., preferably, from 100° C. to 130° C. If the stretching temperature is higher than the melting point plus 10° C., the molecular chain orientation by stretching does not take place because the resin melts. If the stretching temperature is lower than the crystal dispersion temperature, the membrane tends to break during stretching on account of the insufficient softening of the resin, and cannot be stretched at a high draw ratio.

The draw ratio varies depending on the thickness of the original foam. The linear draw ratio in one axial direction is greater than twice, preferably 3 times to 30 times, and the areal draw ratio is greater than 10 times, preferably 20 times to 400 times. With an areal draw ratio smaller than 10 times, the resulting microporous membrane lacks high modulus and high strength on account of insufficient stretching. On the other hand, with an areal draw ratio in excess of 400 times, difficulties exist in the stretching device and operation.

Fibrillation is taken place in the boundary of cells on account of plastic deformation by this stretching treatment, resulting in micropores having effective permeability.

The thus obtained product is washed with a solvent to remove the residual resin solvent medium. The solvent usable for the washing may be a highly volatile solvent including hydrocarbons such as pentane, hexane and heptane, chlorinated hydrocarbons such as methylene chloride and carbon tetrachloride, fluorinated hydrocarbons such as trifluoroethane, and ethers such as diethyl ether and dioxane. The solvents may be used individually or in combination, being selected depending on the type of the solvent used to dissolve the polyolefin. The washing method includes an extraction method by immersing the product with a solvent for extraction, a method of spraying a solvent, or a combination thereof.

In the method (2), a multi-stage stretching method is preferred in which stretching is carried out at high temperature after cold stretching. The cold stretching is preferably carried out at a temperature of −100° C. or lower at a draw ratio of 1.1 times to 2 times, which causes breakage along inner voids such as crazing or shearing bands. Liquid nitrogen or the like can be used as the cooling medium.

Subsequently, the product is preferably subjected to a heat treatment at a temperature ranging from a crystal relaxation temperature (90° C. in the case of polyethylene) to the melting point minus 10° C., then stretched at a draw ratio of from 1.5 times to 5 times at the same temperature range, and further, subjected to heat treatment at the same temperature range.

Expansion of microporous breakage formed by the cold stretching is taken place by the stretching treatment, which can form micropores having effective permeability, The thickness of thus obtained microporous membrane of the present invention is from 2 $\mu$m to 200 $\mu$m, preferably, from 5 $\mu$m to 50 $\mu$m.

(Function)

In the present invention, a molded product having fine cells in a thermoplastic resin is formed, and subjected to plastic deformation for the boundaries of the cells themselves at such an extent as exceeding the shape deformation of the cells to break the boundaries of the cells thereby producing a microporous membrane. The microporous membrane thus formed has excellent permeability and appropriate strength without containing stress concentrators.

The reason why such an effect can be obtained is not always apparent, but it is supposed deformation stresses tend to concentrate on the boundaries of the cells by using cells as a starting structure, tending to cause finer fibrillaltion thereby forming micropores.

EXAMPLES

The present invention will be explained by the following examples. The test methods used in the examples are as follows:
(1) Membrane thickness: Measured for a cross section by a scanning electron microscope.
(2) Tensile break strength: Measured according to ASTM D882.
(3) Air permeability: Measured according to JIS P8117.
(4) Void ratio: Measured by gravimetric method (unit: %)
(5) Porosity: Measured by gravimetric method (unit: %)

Example 1

A mixed liquid of a polyethylene composition was prepared by mixing a resin material (Mw/Mn=18.2) consisting of 3 parts by weight of ultra high molecular weight polyethylene (UHMWPE) having a weight average molecular weight (Mw) of $2.5 \times 10^6$ and 14 parts by weight of polyethylene (PE) having a weight average molecular weight (Mw) of $6.8 \times 10^5$ with 83 parts by weight of liquid paraffin (Kinematic Viscosity;64 cSt/40°). Then, 0.375 parts by weight of an antioxidant was added to and mixed with 100 parts by weight of the mixed liquid. The mixed liquid was filled into an autoclave equipped with a stirrer and stirred for 90 min. at 200° C. to obtain a homogeneous solution.

The solution was extruded from an extruder of 45 mm in diameter through a T-die at 200° C., brought into contact with a cooling roll at 20° C. to form a gel-like sheet of 1.8 mm thickness.

The gel-like sheet was washed again with p-xylene after washing with n-hexane, and subjected to a freeze-dry treatment. The cross section of the sheet was observed by a scanning electron microscope to find that open foams with polyethylene composition constituting the boundary of the cells were formed. The size of the cells (A) was 1.81 $\mu$m, the wall thickness (B) of the cell was 0.18 $\mu$m, the ratio B/A was 0.099 and the void ratio was 83%.

When an ultra-thin slice of a sample embedded in an epoxy resin was observed by using a transmission electron microscope, it was found that the microstructure at the boundary of the cells comprised lamellas stacked in the direction of the thickness, which grew two dimensionally in a planar shape.

Subsequently, the gel-like sheet was subjected to biaxial stretching simultaneously at 5 times×5 times at a temperature of 115° C. and at a draw speed of 5 m/min. The resultant stretched membrane was washed with methylene chloride to extract and remove residual liquid paraffin, and then dried and heat set to obtain a fine polyethylene porous membrane of 25 $\mu$m thickness. The fine polyethylene porous membrane had an air permeability of 570 sec/100 ml, a porosity of 45% and a tensile strength at break of 1120 Kg/cm$^2$. When the surface of the membrane was observed by using a scanning electron microscope, it was found that fine interconnected porous structure was formed on account of connection of the fine fibrous products.

Example 2

A 100 μm-thick sheet was prepared by adding 5 parts by weight of azodicarbonamide (manufactured by Eiwa Chemical Co.) as a foaming agent, 1.0 part by weight of trimethylol propane trimethacrylate as a cross-linking aid, (manufactured by Shin Nakamura Chemical Co.) and 1.0 part by weight of an antioxidant based on 100 parts by weight of a resin component prepared by blending 90 parts by weight of a high density polyethylene (HDPE) having a density of 0.955 g/cm$^3$ and a melt index (MI, 190° C., under a load of 2.16 Kg) of 9 g/10 min. and 10 parts by weight of polybutene-1 (PB-1) (M8340, manufactured by Mitsui Petrochemical Industries Ltd.) having a melt index (MI, 190° C., under load of 2.16 kg) of 4 g/10 min, mixing them for 2 mins. at 30° C. at 500 rpm by using a Henschel mixer, then feeding them into an extruder of 50 mm φ, length/diameter (L/D)=28 equipped with a T-die and extruding the sheet at an extrusion temperature of 150° C.

Then, the sheet was cross-linked by irradiation of electron rays of 750 KV at a dose rate of 8Mrad. Then, the sheet was placed in an air oven at 250° C for 1.0 min to decompose the foaming agent and cause to blow by about 5 times. The sheet had an apparent density after blowing of 0.19 g/cm$^3$.

When the cross section of the sheet was observed by using a scanning electron microscope, it was found that closed foams in which the high molecular composition constituted boundary of the cells were formed. When an ultra-thin slice of a sample embedded in an epoxy resin was observed by using a transmission electron microscope, it was found that the boundary of the cells comprised spherical crystals of microstructure. The sheet had a cell size (A) of 28.2 μm, the wall thickness (B) of a cell of 3.31 μm, a ratio B/A of 0.117 and a void ratio of 80.1%.

Then, the sheet was subjected to a monoaxial stretching treatment at 1.5 times in liquid nitrogen in order to form crazing in the cell wall, and subjected to a heat treatment again at 110° C. for 15 mins. Further, the stretched sheet was subjected to monoaxial stretching by twice, and subjected to heat treatment at an identical temperature for 15 min. to obtain a microporous polyethylene membrane of 150 μm thickness. When the surface was observed by a scanning-type electron microscopes, it was found that a pore interconnected structure was formed on account of connection of fibrous products with each other.

The microporous polyethylene membrane had an air permeability of 970 sec/100 ml, a porosity of 79% and a tensile strength at break of 125 kg/cm$^2$.

COMPARATIVE EXAMPLE 1

A sheet-like product was prepared by feeding 60 parts by weight of high density polyethylene (HDPE) (density; 0.955 g/cc, MI: 0.1 g/10 min),40 parts by weight of calcium carbonate having an average grain size of 0.05 μm, and 0.1 part by weight of a fluorosurfactant into an extruder of 50 m φ in diameter and at L/D=28 g, equipped with a T-die by using a Henschel mixer, and extruding them at 200° C. When the product was observed by a scanning electron microscope, it was found that the dispersibility was poor. The sheet was sequentially subjected to a biaxial stretching treatment in the machine direction by three times at 110° C. and in transverse direction by twice at 120° C. to form a microporous membrane with resultant pin holes. When the surface of the sheet-like product was observed by a scanning electron microscope, it was found that crack-like voids were formed inhomogeneously at the interface with calcium carbonate which propagated locally in a large area to form pin holes.

COMPARATIVE EXAMPLE 2

The sheet obtained in Comparative Example 1 was subjected to an acid-treatment to remove calcium carbonate. When the cross section of the sheet was observed by a scanning electron microscope, dispersibility of cells was poor, in which the cell size (A) was 0.05 μm, a wall thickness (B) the cells was 0.029 μm, a ratio B/A was 0.58 and a void ratio was 40%. The sheet-like product was subjected to sequentially biaxial stretching in machine direction by twice at 110° C., and in transverse direction by 1.5 times at 120° C. to form a microporous membrane with resultant pin holes. When the surface of the sheet was observed by using a scanning electron microscope, it was found that pores were increased inhomogeneously and large cracks were formed locally to form pin holes.

(Effect of the Invention)

As described above specifically, the microporous membrane of the present invention is formed by breaking the boundaries of cell due to plastic deformation of fine cells without filling stress concentrators, in which fine cells are dispersed uniformly, and which has excellent permeability and appropriate strength with no effects of fillers.

Accordingly the microporous membrane is suitable to various application uses such as battery separators, electrolytic capacitor separators, micro-filtration membranes, ultra-filtration membranes, various filters, moisture-permeable and waterproof clothes.

What is claimed is:

1. A method of producing a microporous thermoplastic resin membrane, comprising subjecting a thermoplastic resin foam incorporating microfine cells having a ratio B/A between a void size (A) and a wall thickness (B) of cells from 0.099 to less than 0.5 and having a void ratio of not less than about 50% to plastic deformation to deform the shape of the cells, and breaking boundaries of the cells.

2. The method of producing a resin membrane as defined in claim 1, wherein the ratio B/A between the cell size (A) and the wall thickness (B) of the cells is from 0.099 to less than 0.3 and the void ratio is not less than about 70%.

3. The method of producing a microporous thermoplastic resin membrane as defined in claim 1, wherein the thermoplastic resin foam is obtained by cooling a solution of a thermoplastic resin into a gel.

4. The method of producing a microporous thermoplastic resin membrane as defined in claim 1, wherein the thermoplastic resin foam is obtained by mixing a thermoplastic resin with an organic decomposable foaming agent and then decomposing the organic foaming agent by heating.

5. The method of producing a microporous thermoplastic resin membrane as defined in claim 1, wherein the thermoplastic resin foam contains a high density polyethylene.

6. The method of producing a microporous thermoplastic membrane as defined in claim 1, wherein the plastic deformation is carried out by stretching or calendering followed by stretching.

7. A method of producing a microporous thermoplastic resin membrane, comprising:

forming a microporous thermoplastic resin foam containing a high density polyethylene by cooling a solution of thermoplastic resin containing a high density polyethylene to form a low density gel, subjecting said thermoplastic resin foam incorporating microfine cells having a ratio B/A between a void size (A) and a wall thickness (B) of cells from 0.099 to less than 0.3 and having a void ratio of at least about 70% to plastic deformation of the boundaries of said cells to deform the shape of the cells, said plastic deformation carried out by stretching or calendaring, followed by a step of stretching, and breaking the boundaries of the cells.

* * * * *